Patented Apr. 9, 1946

2,398,179

UNITED STATES PATENT OFFICE 2,398,179

MANUFACTURE OF ETHYL CHLORIDE

Eugen Gottfried Galitzenstein, London, and Cyril Woolf, Finchley, London, England, assignors to The Distillers Company Limited, Edinburg, Scotland, a British company No Drawing. Application March 9, 1944, Serial No. 525,758. In Great Britain December 28, 1942

20 Claims. (Cl. 260—652)

It is known that ethyl chloride is formed when potassium or barium salts of ethyl sulphuric acid are treated with hydrogen chloride (Berichte der Deutschen Chemischen Gesellschaft 1878, 11, 1929). In British specification No. 370,211 there is described a process in which ethyl chloride is produced when ethyl sulphuric acid is caused to react with aqueous hydrochloric acid at temperatures exceeding 100° C. and at elevated pressures such as 24 atmospheres.

We have found that ethyl chloride can be produced satisfactorily according to the present invention by reacting gaseous hydrogen chloride with preformed sulphuric esters of ethyl alcohol in the presence of a compound of antimony, bismuth or tin as catalyst at temperatures between 40° and 110° C. The chlorides, oxides, sulphates or carbonates of antimony, bismuth and tin may be used.

The reaction between ethyl hydrogen sulphate and hydrogen chloride proceeds according to the equation:

(1)  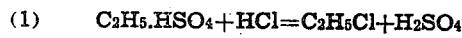

and can be carried out at normal pressure.

Instead of ethyl sulphuric acid, diethyl sulphate can be used. We have found that when ethyl chloride is produced by the interaction of hydrogen chloride and diethyl sulphate in the presence of compounds of antimony, bismuth or tin, the initiation of the reaction is facilitated by the presence of some free sulphuric acid in the reaction mixture at the commencement of the reaction. The probable function of this free sulphuric acid is to cause the formation of ethyl sulphuric acid according to the equattion:

(2)  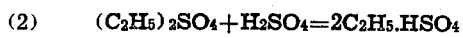

The following examples illustrate the process of the invention as a batch process:

Example I

A stirring flask was charged with 214 grams ethyl sulphuric acid. 14 grams of anhydrous antimony trichloride were added and dry hydrogen chloride was then introduced at the rate of about 3 grams per hour whilst maintaining the liquid at a temperature of 20° C. Stirring was continued throughout the operation. The vapours escaping from the stirring flask consisted of ethylchloride accompanied by some excess of hydrogen chloride which was removed from the ethyl chloride by washing with water and then with caustic soda solution. The vapours of ethyl chloride were dried with calcium chloride and then condensed out. The yield of pure ethylchloride, obtained over a period of ten hours, was 102 grams or 93 per cent of the theory.

Example II

Into a stirred mixture of 220 grams diethylsulphate, 36 grams sulphuric acid (98 per cent) and 6 grams bismuth oxide, dry hydrogen chloride was introduced at the rate of about 6 grams per hour whilst maintaining a temperature of 80° C. in the reaction liquid. The escaping gases were washed with water and then with milk of lime, dried with calcium chloride and the ethyl chloride condensed out. In 20 hours 163 grams of practically pure ethylchloride were collected, the yield being 90 per cent of the theory.

Example III

A stirred mixture of 105 grams diethylsulphate, 70 grams sulphuric acid (100 per cent) and 17 grams anhydrous tin tetrachloride was treated with a stream of about 7 grams per hour of dry hydrogen chloride at a temperature of 98° C. The escaping vapours were led through a fractionating column at the top of which a vapour temperature of 13° C. was maintained by means of a reflux condenser. After washing and drying ethylchloride was condensed at the rate of 12 grams per hour.

It will be inferred from Equations 2 and 1 that on completion of the reaction between the esters of sulphuric acid and hydrogen chloride, free sulphuric acid is present together with the metal compounds. We have found that the spent liquids resulting from the reaction between ethyl sulphuric esters and hydrogen chloride have the power of absorbing ethylene thus reforming the original sulphuric acid esters. The reformed esters are capable of reacting again with hydrogen chloride to produce ethylchloride without the necessity of further addition of compounds of antimony, bismuth and tin.

Accordingly, therefore, our invention includes a process for the manufacture of ethyl chloride from ethylene. The process consists of a number of cycles, each cycle comprising two stages. In the first stage, ethylene is absorbed by sulphuric acid. Compounds of antimony, bismuth or tin are added to the resulting liquid and the second stage of the process consists in reacting the mixture with hydrogen chloride to produce ethyl chloride. These two stages comprise the first cycle. In the first stage of the second cycle, ethylene is again absorbed following which, hydrogen chloride is again passed through the liquid reaction medium, which still contains the catalyst remaining from the first cycle, producing ethyl chloride: this constitutes the second stage of the second cycle. Further cycles are the same as the second cycle.

We prefer to carry out our process in a substantially anhydrous medium using sulphuric acid of between 100 per cent and 95 per cent by weight.

We have found it to be advantageous in the stages of ethylene absorption to introduce ethylene until the concentration of ethyl groups present (in the form of the sulphuric esters of ethyl alcohol) has reached between 0.7 to 1.2 mols per mol of sulphuric acid. Such mixtures of diethylsulphate, ethylsulphuric acid and sulphuric acid have been found to be the most suitable for the production of ethylchloride. Furthermore we have found it unnecessary to continue the hydrogen chloride introduction to the point of completion of the reaction: we prefer to stop the flow of hydrogen chloride when the rate of ethylchloride production slackens off. This generally occurs when the concentration of ethyl groups has fallen to the neighbourhood of 0.25 mol per mol of sulphuric acid present in the reaction medium. By leaving some unreacted ethyl groups in the solution, the subsequent absorption of ethylene is enhanced, as is already known from prior British specification No. 221,512.

The following examples illustrate the process of the invention as a continuous process consisting of a number of successive cycles.

*Example IV*

A stirring vessel was charged with 180 grams sulphuric acid (98 per cent) and 12 grams anhydrous bismuth chloride. The contents of the vessel were stirred and maintained at 70° C. during the whole operation. Dry ethylene was introduced at the rate of 11–12 grams per hour for 4 hours. The ethylene supply was then cut off and dry hydrogen chloride introduced at the rate of about 9 grams per hour to start the production of ethylchloride. When the rate of formation of ethylchloride dropped below a figure of 6 grams per hour the introduction of hydrogen chloride was cut off, the passage of ethylene was restarted and the second and subsequent cycles carried out. The results of the entire operation are summarized in the following table:

| No. of cycles | Ethylene absorbed | Ethylene absorption period | Ethyl chloride produced | Time of ethylchloride production period | Time of cycle |
|---|---|---|---|---|---|
| | Grams | Hours | Grams | Hours | Hours |
| 1 | 41 | 4 | 63 | 5½ | 9½ |
| 2 | 33 | 4 | 69 | 5½ | 9½ |
| 3 | 31 | 4½ | 72 | 6 | 10½ |
| 4 | 32 | 4 | 71 | 7 | 11 |
| 5 | 31 | 4 | 68 | 7 | 11 |
| 6 | 30 | 5 | 63 | 7 | 11 |
| 7 | 30 | 5 | 71 | 7 | 12 |
| 8 | 31 | 4½ | 73 | 8 | 12½ |
| 9 | 30 | 4 | 58 | 8 | 12 |
| 10 | 23 | 3 | 58 | 8 | 12 |
| Totals | 312 | 41 | 666 | 69 | 110 |

The yield of ethyl chloride based on ethylene absorbed was 94 per cent of the theory. The reaction liquid was still active after the tenth cycle.

*Example V*

183 grams of sulphuric acid (100 per cent) containing 12 grams anhydrous antimony trichloride were heated to 70° C. and ethylene introduced whilst stirring until the weight of the reaction liquid showed an increase in weight of 47 grams corresponding to an absorption of 0.9 mol of ethylene per mol of sulphuric acid. The temperature was then raised to 90° C., hydrogen chloride was introduced and ethylchloride condensed out of the effluent gases. When the production rate of ethylchloride began to decrease, the hydrogen chloride stream was stopped, the temperature lowered to 70° C. and ethylene introduced (beginning a second cycle of operations) and the absorption of ethylene was continued until an increase in weight of 38 grams had occurred thus again bringing the total amount of ethyl groups present to 0.9 mol per mol of sulphuric acid. The subsequent introduction of hydrogen chloride was carried out at 90° C. Further cycles followed in a way similar to the last cycle. After a working time of 150 hours the yield of ethylchloride produced based on ethylene absorbed amounted to 88 per cent of the theory.

Instead of pure ethylene, gas mixtures containing ethylene, e. g. mixtures of ethylene and paraffin hydrocarbons, can be used. We have found it advantageous to employ elevated pressure in the ethylene absorption stage when using ethylene admixed with other gases. The corresponding stages of ethylchloride production may be carried out in a separate vessel and at ordinary pressure. Previous processes (e. g. that described in United States specification No. 2,125,284) relating to the direct reaction between hydrogen chloride and gas mixtures containing ethylene have proved to be technically unsatisfactory as the presence of inert gaseous substances depresses the rate of formation of ethylchloride and gives rise to difficulties in the recovery of the diluted ethylchloride. However, the ethylchloride obtained by our process, is contaminated only with hydrogen chloride, which is readily removed.

Instead of a stirring vessel, other suitable devices can be employed for alternately contacting the liquid reaction medium with ethylene and with hydrogen chloride. For instance the two gases may be alternately passed into a coil system through which the liquid reaction medium is circulated at high speed with aid of a pump.

The experiments on which the present invention is based proved that the presence of compounds of antimony, bismuth or tin is essential for the manufacture of ethylchloride from hydrogen chloride and the ethyl esters of sulphuric acid. No ethylchloride production could be obtained when working according to United States specification No. 2,284,467 in which there is described the production of alkylchlorides by contacting an olefine and hydrogen chloride with sulphuric acid (97 to 100 per cent) at atmospheric pressure and at a temperature between room temperature and the freezing point of sulphuric acid.

What we claim is:

1. A process for the manufacture of ethyl chloride which comprises reacting substantially anhydrous gaseous hydrogen chloride with a substantially anhydrous preformed sulphuric ester of ethyl alcohol in the presence of free sulphuric acid of a concentration of 95% to 100% and in the presence of a catalyst of the class consisting of compounds of antimony, tin and bismuth at a temperature between 40° C. and 110° C.

2. A process according to claim 1 wherein said sulphuric ester is ethyl hydrogen sulphate.

3. A process according to claim 1 wherein said sulphuric ester is diethyl sulphate.

4. A process according to claim 1 wherein a mixture of diethyl sulphate and sulphuric acid is employed.

5. A process according to claim 1 wherein said preformed sulphuric ester contains ethyl groups to a value between 0.7 and 1.2 mols per mol of sulphuric acid.

6. A process according to claim 1 wherein the feed of hydrogen chloride is stopped when the content of ethyl groups in the reaction liquid has fallen to a value in the neighbourhood of 0.25 mol per mol of sulphuric acid.

7. A process for the manufacture of ethyl chloride which comprises reacting substantially anhydrous gaseous hydrogen chloride with a substantially anhydrous preformed sulphuric ester of ethyl in the presence of free sulphuric acid of a concentration of 95% to 100% and alcohol in the presence of a catalyst of the class consisting of compounds of antimony, tin and bismuth at a temperature between 40° C. and 110° C. until the content of ethyl groups in the reaction liquid has fallen to a value in the neighbourhood of 0.25 mol per mol of sulphuric acid, stopping the feed of hydrogen chloride, feeding ethylene into the reaction liquid to regenerate the said sulphuric ester-sulphuric acid mixture and thereafter restarting the feed of hydrogen chloride.

8. A process according to claim 7 wherein the feed of ethylene is stopped when the content of ethyl groups in the reaction liquid has reached a value between 0.7 and 1.2 mols per mol of sulphuric acid.

9. A process according to claim 7 wherein the feed of ethylene is stopped when the content of ethyl groups in the reaction liquid has reached a value between 0.7 and 1.2 mols per mol of sulphuric acid and the feed of hydrogen chloride is stopped when the content of ethyl groups in the reaction liquid has fallen to a value in the neighbourhood of 0.25 mol per mol of sulphuric acid.

10. A continuous process for the manufacture of ethyl chloride which comprises alternate stages of ethylene feed into sulphuric acid of a concentration of 95% to 100% containing a catalyst of the class consisting of compounds of antimony, tin and bismuth and gaseous substantially anhydrous hydrogen chloride feed into the sulphuric ester-sulphuric acid mixture thereby produced at a temperature of 40° C. to 110° C.

11. A continuous process according to claim 10 wherein the temperature of the reaction liquid during the stage of ethylene feed is lower than during the stage of feeding hydrogen chloride.

12. A continuous process according to claim 10 wherein the stage of feeding ethylene is terminated when the reaction liquid contains ethyl groups to a value between 0.7 and 1.2 mols per mol of sulphuric acid.

13. A continuous process according to claim 10 wherein the stage of feeding gaseous hydrogen chloride is terminated when the reaction liquid contains ethyl groups to a value in the neighbourhood of 0.25 mol per mol of sulphuric acid.

14. A continuous process according to claim 10 wherein the ethylene feed is a mixture of ethylene and an inert gas.

15. A continuous process according to claim 10 wherein the ethylene mixed with inert gas is fed under superatmospheric pressure.

16. A continuous process for the manufacture of ethyl chloride which comprises alternate stages of ethylene feed into sulphuric acid of a concentration of 95% to 100% containing a catalyst of the class consisting of compounds of antimony, tin and bismuth at a temperature of about 70° C. and gaseous substantially anhydrous hydrogen chloride feed into the sulphuric ester-sulphuric acid mixture thereby produced at a temperature of about 90° C.

17. A continuous process for the manufacture of ethyl chloride which comprises absorbing ethylene in sulphuric acid of a concentration of 95 to 100%, adding a catalyst of the class consisting of compounds of antimony, tin and bismuth, reacting the resulting sulphuric ester-sulphuric acid mixture with substantially anhydrous gaseous hydrogen chloride at a temperature of 40° to 110° C., continuously distilling off formed ethyl chloride and returning the sulphuric acid-containing residue to the ethylene absorption stage.

18. A continuous process for the manufacture of ethyl chloride which comprises absorbing ethylene in sulphuric acid of a concentration of 95 to 100%, adding a catalyst of the class consisting of compounds of antimony, tin and bismuth, reacting the resulting sulphuric ester-sulphuric acid mixture with substantially anhydrous gaseous hydrogen chloride at substantially atmospheric pressure at a temperature of 40° to 110° C., continuously distilling off formed ethyl chloride and returning the sulphuric acid-containing residue to the ethylene absorption stage.

19. A continuous process for the manufacture of ethyl chloride which comprises absorbing ethylene in sulphuric acid of a concentration of 95 to 100%, adding a catalyst of the class consisting of compounds of antimony, tin and bismuth, reacting the resulting sulphuric ester-sulphuric acid mixture with substantially anhydrous gaseous hydrogen chloride at substantially atmospheric pressure at a temperature of 70° to 90° C., continuously distilling off formed ethyl chloride and returning the sulphuric acid-containing residue to the ethylene absorption stage.

20. A continuous process for the manufacture of ethyl chloride which comprises introducing ethylene into 95 to 100% sulphuric acid, containing a catalyst of the class consisting of compounds of antimony, tin and bismuth, in an absorber, withdrawing from said absorber a reaction product, consisting of ethyl sulphuric esters and sulphuric acid, containing between 0.7 mol and 1.2 mols of ethyl groups per mol of sulphuric acid and introducing it to a reactor, introducing substantially anhydrous gaseous hydrogen chloride into said reaction product, maintaining a temperature in said reactor of between 40° and 110° C., continuously withdrawing ethyl chloride therefrom and continuously recycling to said absorber the partially exhausted reaction product containing ethyl groups in the ratio of about 0.25 mol per mol of sulphuric acid.

EUGEN GOTTFRIED GALITZENSTEIN.
CYRIL WOOLF.